(12) United States Patent
Quere et al.

(10) Patent No.: US 10,137,645 B2
(45) Date of Patent: Nov. 27, 2018

(54) PROCESS AND MACHINE FOR MANUFACTURING AN OPHTHALMIC LENS

(71) Applicant: ESSILOR INTERNATIONAL (COMPAGNIE GENERALE D'OPTIQUE, Charenton-le-Pont (FR)

(72) Inventors: Loic Quere, Charenton-le-Pont (FR); Alexandre Gourraud, Charenton-le-Pont (FR); Pascal Allione, Charenton-le-Pont (FR); Cedric Begon, Charenton-le-Pont (FR)

(73) Assignee: ESSILOR INTERNATIONAL, Charenton-le-Pont (FR)

( * ) Notice: Subject to any disclaimer, the term of this patent is extended or adjusted under 35 U.S.C. 154(b) by 329 days.

(21) Appl. No.: 14/895,759

(22) PCT Filed: Jun. 6, 2014

(86) PCT No.: PCT/FR2014/051362
§ 371 (c)(1),
(2) Date: Dec. 3, 2015

(87) PCT Pub. No.: WO2014/195653
PCT Pub. Date: Dec. 11, 2014

(65) Prior Publication Data
US 2016/0101573 A1 Apr. 14, 2016

(30) Foreign Application Priority Data
Jun. 7, 2013 (FR) ...................................... 13 55302

(51) Int. Cl.
*B29C 67/00* (2017.01)
*B29D 11/00* (2006.01)
(Continued)

(52) U.S. Cl.
CPC ........ *B29C 67/0088* (2013.01); *B29C 64/106* (2017.08); *B29D 11/00009* (2013.01);
(Continued)

(58) Field of Classification Search
CPC ........ B29D 11/00009; B29D 11/00961; B29D 11/0098; B29D 11/00932; B29C 67/0088; B29C 64/106; B33Y 10/00; G02C 7/028
See application file for complete search history.

(56) References Cited

U.S. PATENT DOCUMENTS

2004/0046287 A1 3/2004 Andino et al.
2011/0042839 A1 2/2011 Tanimura et al.
(Continued)

FOREIGN PATENT DOCUMENTS

EP 2 474 404 A1 7/2012
EP 2 537 642 A1 12/2012
(Continued)

OTHER PUBLICATIONS

International Search Report, dated Sep. 11, 2014, from corresponding PCT application.

*Primary Examiner* — Mathieu D Vargot
(74) *Attorney, Agent, or Firm* — Young & Thompson

(57) ABSTRACT

A process for manufacturing an ophthalmic lens (10) having at least one optical function, includes: a step (100) of additively manufacturing the ophthalmic lens (10) by depositing a plurality of preset volume elements of at least one material having a preset refractive index in order to form a target geometric envelope; a step of determining an actual geometric envelope at least once during the implementation of the additive manufacturing step (100); and a step of triggering a corrective action if there is in a zone a discrepancy larger than a preset threshold between the target geometric envelope and the actual geometric envelope.

11 Claims, 3 Drawing Sheets

(51) Int. Cl.
  B33Y 10/00  (2015.01)
  G02C 7/02  (2006.01)
  B29C 64/106  (2017.01)
  *B29K 33/00*  (2006.01)
  *B29K 105/00*  (2006.01)
  *B29L 11/00*  (2006.01)
(52) U.S. Cl.
  CPC .... B29D 11/0098 (2013.01); B29D 11/00432 (2013.01); B29D 11/00961 (2013.01); B33Y 10/00 (2014.12); G02C 7/028 (2013.01); *B29K 2033/12* (2013.01); *B29K 2105/0058* (2013.01); *B29K 2995/0031* (2013.01); *B29L 2011/0016* (2013.01)

(56) References Cited

U.S. PATENT DOCUMENTS

| | | |
|---|---|---|
| 2012/0240736 A1 | 9/2012 | Martin et al. |
| 2013/0286073 A1* | 10/2013 | Blessing ............... B29D 11/00 347/14 |
| 2014/0199918 A1 | 7/2014 | Bultez |

FOREIGN PATENT DOCUMENTS

| | | | |
|---|---|---|---|
| WO | 2011/083234 A1 | | 7/2011 |
| WO | 2013/030495 A1 | | 3/2013 |
| WO | WO 2015/014380 | * | 2/2015 |

\* cited by examiner

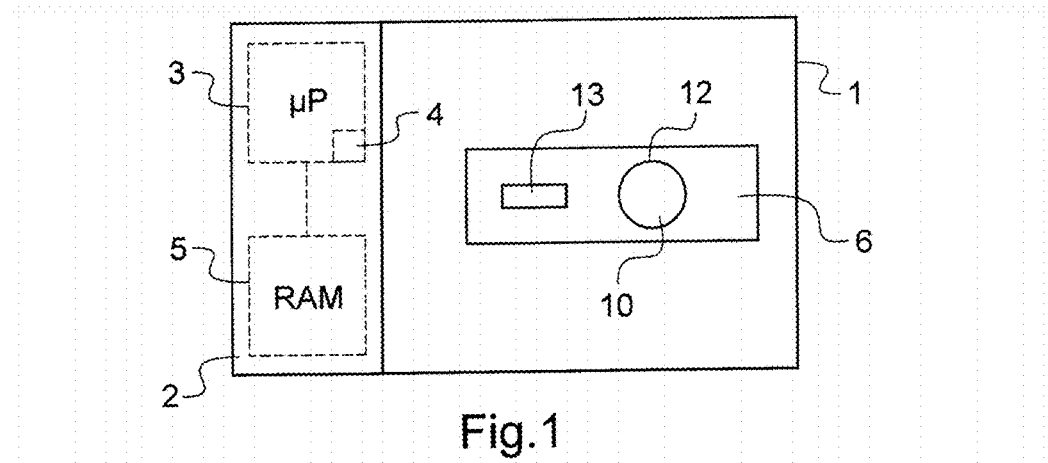
Fig.1
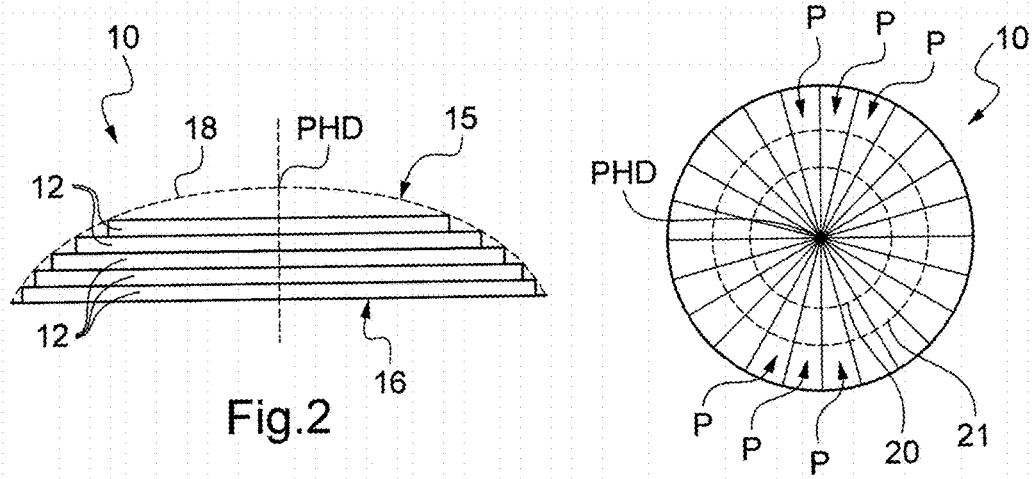
Fig.2
Fig.3
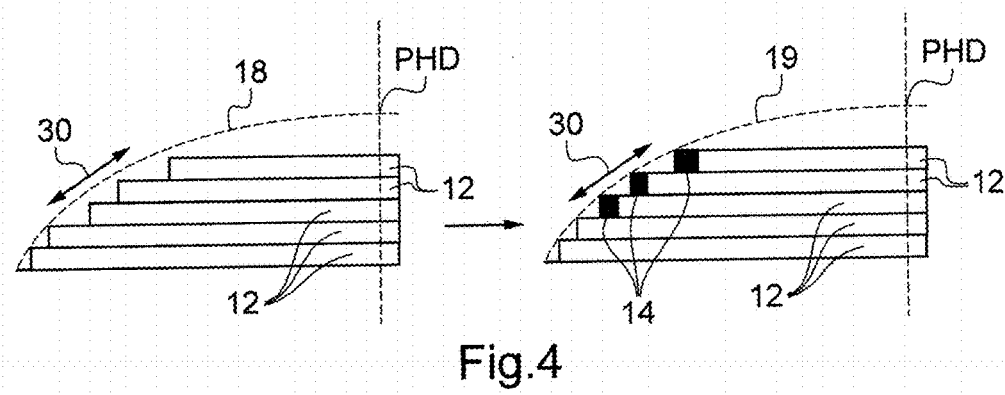
Fig.4

PROCESS AND MACHINE FOR MANUFACTURING AN OPHTHALMIC LENS

FIELD OF THE INVENTION

The invention relates to the field of the manufacture of ophthalmic lenses having at least one optical function, for example progressive ophthalmic lenses.

The invention more particularly relates to a process for manufacturing such ophthalmic lenses.

The invention also relates to a machine for manufacturing such ophthalmic lenses.

TECHNOLOGICAL BACKGROUND

It is known that ophthalmic lenses are subjected to various manufacturing steps in order to give them the prescribed ophthalmic properties.

Processes for manufacturing ophthalmic lenses are known that comprise a step of providing an unprocessed or semi-finished lens blank, i.e. a lens blank none of the faces or only one of the faces of which is what is referred to as finished (or in other words a face that defines a simple or complex optical surface).

These processes then comprise one or more steps of turning at least one face of the unprocessed lens blank, in order to obtain what is referred to as a finished face, defining the sought-after optical surface providing the (possibly complex) ophthalmic properties prescribed to the wearer of the ophthalmic lens.

The optical function of an ophthalmic lens is provided mainly by two diopters, corresponding to the front and back faces of the ophthalmic lens. The topography of the surface to be produced depends on the repartition of the function applied between the front and back faces of the lens.

The expression "one or more steps of machining" is here understood to mean steps of what are referred to as roughing, finishing and polishing (machining by surfacing).

The roughing step makes it possible, starting from an unprocessed or semi-finished lens blank, to give those face(s) of the lens blank which are defined as unfinished its (their) surface curvature, whereas the finishing (also called smoothing) step consists in fining the grain or even the precision of the radii of curvature of the faces obtained beforehand and allows the curved surface(s) generated to be prepared (smoothed) for the polishing step. This polishing step is a step of surfacing the roughed or smoothed curved surface(s), and makes it possible to make the ophthalmic lens transparent. The roughing and finishing steps are the steps that set the thickness of the final lens and the radii of curvature of the treated surface, independently of the thickness of the initial object and of its initial radii of curvature.

Generally, the time taken to machine a face of an ophthalmic lens depends on the machine used, on the material and on the complexity of the sought optical surface.

Machining speed is not without effect on the conformity of the optical surface produced to the desired surface. Thus, a very low speed may make it possible to ensure the conformity of a surface but it will affect the productivity thereof. In contrast, a high speed makes it possible to increase productivity but may affect conformity.

Generally, trials need to be carried out for complex surfaces in order to determine an optimal machining speed, this decreasing productivity.

Methods for determining an optimal rotation speed for machining such a lens, independently of the material thereof, from geometric characteristics of the surface to be produced, are known from patent applications WO 2011/083234 and WO 2013/030495.

SUBJECT OF THE INVENTION

The invention aims to provide a process for manufacturing an ophthalmic lens having at least one optical function, this process being different from a turning process and particularly simple, convenient and economical to implement.

Thus, the subject of the invention, according to a first aspect, is a process for manufacturing an ophthalmic lens having at least one optical function, characterized in that it comprises:

the step of additively manufacturing said ophthalmic lens, by depositing a plurality of predetermined volume elements of at least one material having a predetermined refractive index, in accordance with a target geometric envelope;

the step of determining an actual geometric envelope at least once during the implementation of said additive manufacturing step; and the step of triggering a corrective action if there is in a zone a difference larger than a predetermined threshold between said target geometric envelope and said actual geometric envelope.

Additive manufacturing techniques are a particularly appropriate way of meeting the objective of the invention.

The expression "additive manufacturing" is understood to mean, according to international standard ASTM 2792-12, manufacturing techniques comprising a process involving putting together or combining materials in order to manufacture objects from 3-D modeling data (typically a computer-assisted design (CAD below) file), usually layer by layer, as opposed to subtractive manufacturing methodologies, such as traditional machining.

Additive manufacturing technologies consist in manufacturing objects by juxtaposing solid material elements in accordance with a predetermined arrangement contained in digital form in a CAD file.

These elementary volume elements, denoted "voxels", may be created and juxtaposed using a variety of different technical principles, for example by providing drops of photopolymerizable monomers by means of a print head, by selectively photopolymerizing with a source of UV light near the surface of a bath of monomer (stereolithography technique), or by melting polymer powder (selective laser melting (SLM) or selective laser sintering (SLS)).

Additive manufacturing techniques allow the geometry of objects to be defined with a great deal of flexibility, but raise a number of problems if one desires to manufacture transparent ophthalmic lenses that do not scatter light and that provide an optical prescription by way of a very precise diopter geometry on each face of the lens; these diopters can be spherical, or pseudo-spherical or sphero-toric or pseudo-sphero-toric.

The following problems are specially encountered:

voxel-by-voxel construction does not lend itself well to obtaining the smooth surfaces that are required for optical applications; and additive construction techniques make it difficult to control the dimensional characteristics of the product element with the precision required for an optical application; in particular it is difficult to achieve with an excellent precision local control of the radius of curvature of the lens.

It will be seen that the invention takes account of these problems inherent to additive manufacturing in order to make it compatible with the manufacture of an ophthalmic lens.

The manufacturing process according to the invention is particularly simple, easy and economic, above all in the context of production of a wide diversity of optical functions (because of the personalization of these optical functions), requiring manufacturing processes that are rapid and flexible.

It will also be noted that the expression "optical function" when applied to a lens, is understood to mean the optical response of this lens i.e. a function defining any modification of the propagation and transmission of an optical beam through the lens in question, whatever the incidence of the entering optical beam and whatever the geometric extent of the entrance diopter illuminated by the incident optical beam.

More precisely, in the ophthalmic field, optical function is defined as the distribution of wearer power and astigmatism characteristics and of higher-order aberrations associated with the lens for all the directions of the gaze of a wearer of this lens. Of course, this assumes that the geometric position of the lens relative to the eye of the wearer is already known.

The process according to the invention makes it particularly simple and easy to additively manufacture with precision the ophthalmic lens on the basis of values that it is possible to obtain with mathematical tools that are standard in the field of optics, these mathematical tools making it possible, from a file defining the surface by way of a finite number of points, each of which is given by its coordinates, for example in a Cartesian coordinate system, to determine a target geometric envelope of the lens and then an actual geometric envelope of the lens in the course of its additive manufacture, and, depending on the geometric difference between these target and actual envelopes, to trigger a corrective action if needs be.

Thus, in the process according to the invention, the monitoring carried out during manufacture is not the position of material-depositing tools, such as nozzles, but the actual geometric envelope of the lens during its manufacture; and, if needs be, a corrective action is triggered on the ophthalmic lens during manufacturing.

According to advantageous features, said corrective action includes depositing on said zone at least one additional predetermined volume element and/or determining a modified target geometric envelope replacing said target geometric envelope.

It will be noted that the target geometric envelope corresponds to starting manufacturing settings (or framework) of the lens whereas the modified target geometric envelope corresponds to modified manufacturing settings of the lens, this modification being made after a difference larger than a predetermined threshold between the objective (target lens) and the actual case (manufactured lens) has been detected.

Depositing at least one additional predetermined volume element and/or determining a modified target geometric envelope replacing the target geometric envelope being produced is an excellent way of correcting any nascent defects, any deficit in material being filled and/or the geometry targeted for the ophthalmic lens being changed during manufacture, so that the sought-after optical function is obtained with said lens when it is completed.

Thus, the main factor taken into account during manufacture of the ophthalmic lens is not whether the geometry initially set is respected but whether its optical function is respected, the ophthalmic lens fabricated in certain cases having a geometry different from the geometry initially set.

Of course, corrections are made as many times as is appropriate.

One of the major factors to be taken into account when determining whether or not a corrective action is carried out is the time to the end point of the ophthalmic lens manufacturing process.

According to advantageous features, said step of triggering a corrective action includes:
 implementing a first corrective action if there is, in said zone, between said target geometric envelope and said actual geometric envelope, a difference larger than a first predetermined threshold and lower than a second predetermined threshold; and
 implementing a second corrective action different from the first corrective action if there is, in said zone, between said target geometric envelope and said actual geometric envelope, a difference larger than said second predetermined threshold.

With these features, the corrective action implemented if required is particularly fine, thereby allowing a high-precision ophthalmic lens to be obtained.

According to advantageous features, said first corrective action includes depositing, on said zone, at least one additional predetermined volume element without replacing the target geometric envelope, this deposition being said to be an altitude addition, whereas the second corrective action includes determining a modified target geometric envelope replacing said target geometric envelope.

The process according to the invention makes it possible to initiate the additive manufacturing of the lens based on the starting manufacturing settings and, in the case where a difference is observed between the target and actual envelopes, and depending on the geometric value of this difference, either a set number of predetermined volume elements are added altitude-wise to the lens, the manufacturing process continuing to use the starting manufacturing settings, or a modified target geometric envelope is determined, the manufacturing process then using these modified manufacturing settings.

According to advantageous features, the second corrective action furthermore includes depositing, on said zone, at least one additional predetermined volume element, this deposition being said to be a curvature addition.

Thus, depending on the threshold values, the corrective action may be an altitude addition, a curvature addition or a simple modification of the target geometric envelope without addition of material. According to advantageous features:
 said step of determining an actual geometric envelope includes the step of determining at least one geometric value representative of the average curvature in said zone; and
 to determine said difference in said zone, said process includes the step of comparing said at least one geometric value representative of the average curvature to a geometric value representative of the target average curvature for said zone and determined from said target geometric envelope.

In the process according to the invention, such a difference is determined from calculations allowing geometric values representative of average curvatures at various points on the lens to be obtained during the additive manufacturing. Taking into account such values relating to average surface curvatures allows the geometric envelope of the lens to be defined and makes the process according to the invention particularly precise since it is a question of values that are perfectly representative of how difficult it is to produce a surface i.e. to obtain the desired optical function. Specifically, these geometric values may especially allow the average geometric sphere at a point on the surface of the ophthalmic lens to be calculated, which is expressed in diopters and is at least partially representative of this optical function.

Thus, the process according to the invention makes it possible, by way of relatively simple calculations, based on conventional tools for calculating optical surfaces, to determine any manufacturing errors (differences) in the surface, and to determine the way to correct them by additive manufacturing.

Of course, it is on the basis of a calibration, easily achieved within a reasonable number of trials, that the rules for determining the way in which errors are corrected (in other words the thresholds), are set from the result of comparison of geometric values representative of target and modified-target average curvatures.

According to advantageous features of the process according to the invention:
- said step of determining at least one geometric value representative of the average curvature includes the step of measuring at least one pair of radii of curvature associated with a given point in said zone;
- said step of determining at least one geometric value representative of the average curvature furthermore includes the step of determining the geometric value of the average curvature at said given point in said zone and/or a value representative of the largest difference in average-curvature geometric values in said zone, from measured geometric values of said at least one pair of radii of curvature;
- said step of determining at least one geometric value representative of the average curvature furthermore includes the step of determining actual geometric characteristics of said ophthalmic lens, defining said actual geometric envelope, from measured geometric values of said at least one pair of radii of curvature and/or from said average-curvature geometric value determined in said zone and/or from said value representative of the largest difference in average-curvature geometric values in said zone; and/or
- said zone has a finalized target curvature profile.

Another subject of the invention, according to a second aspect, is an additive manufacturing machine configured to manufacture an ophthalmic lens and comprising a command/control unit provided with system elements configured to run a computer program comprising instructions configured to implement each of the steps of the process described above.

According to preferred, simple, easy and economical features, the machine according to the invention furthermore includes a measuring device configured to measure geometric values representative of the average curvature at least at a given point in at least one zone of said ophthalmic lens.

BRIEF DESCRIPTION OF THE DRAWINGS

The subject matter of the invention will now be explained by way of a description of one embodiment thereof, given, by way of nonlimiting illustration, below with reference to the appended drawings, in which:

FIG. 1 schematically shows an additive manufacturing machine configured to produce an ophthalmic lens;

FIGS. 2 and 3 schematically show in cross section and from above, respectively, the ophthalmic lens during manufacture;

FIG. 4 schematically shows various steps for manufacturing the ophthalmic lens using the machine illustrated in FIG. 1;

DETAILED DESCRIPTION OF AN EXAMPLE EMBODIMENT

Figure 5:
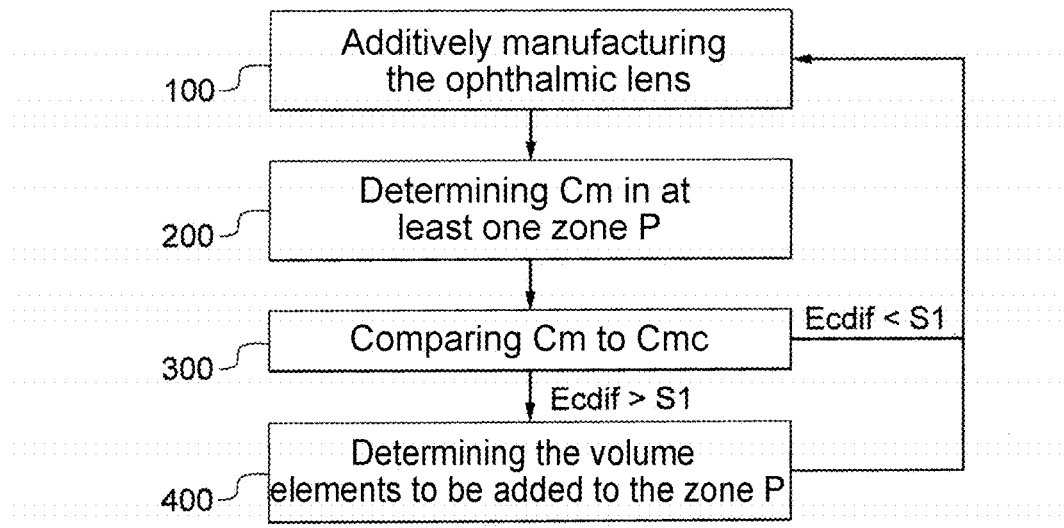
FIG. 5 is a flowchart illustrating various operating steps of a process for manufacturing an ophthalmic lens, including the steps illustrated in FIG. 4.

FIG. 1 illustrates a machine 1 for additively manufacturing an ophthalmic lens 10, here a digitally controlled three-dimensional printing machine.

Digitally controlled designates that the additive manufacturing machine 1 includes a suite of hardware configured to give motional instructions to all the units that this machine comprises.

The additive manufacturing machine 1 is here configured to deposit juxtaposed a plurality of predetermined volume elements forming superposed layers (layer-by-layer deposition in other words) of at least one material on a manufacturing holder 12 so as to form the ophthalmic lens 10.

This ophthalmic lens 10 is for example progressive and furthermore possesses toroidal and prismatic components.

Each predetermined volume element is defined by a predetermined composition and a predetermined size.

As it is here a question of additive manufacturing and in particular of three-dimensional printing, volumetric elements or volume elements, also referred to as voxels (three-dimensional pixels), are also spoken of.

This ophthalmic lens 10 is therefore borne by the manufacturing holder 12.

It will be noted that this manufacturing holder 12 is a predetermined holder of the additive manufacturing machine 1 and therefore its geometric characteristics are known and contained in a file that is stored in or loaded into a first command/control unit 2 of the additive manufacturing machine 1.

The hardware of the additive manufacturing machine 1 is furthermore configured to generate motional, handling and control instructions for materials and for polymerization devices that the additive manufacturing machine 1 comprises.

The manufacturing holder 12 of the additive manufacturing machine 1 includes a body provided with a manufacturing surface which presents here a generally planar shape (not shown).

The additive manufacturing machine 1 comprises a nozzle or a bank of nozzles 13 in addition to the command/control unit 2, and the latter is provided with a data processing system comprising a microprocessor 3 equipped with a memory 4, in particular a nonvolatile memory, allowing the microprocessor 3 to load and store a software package, in other words a computer program, that, when it is run by the microprocessor 3, allows an additive manufacturing method to be implemented. This nonvolatile memory 4 is for example a read-only memory (ROM).

The unit 2 furthermore comprises a memory 5, in particular a volatile memory, making it possible to store data during the execution of the software package and the implementation of the additive manufacturing method.

This volatile memory 5 is for example a random access memory (RAM) or an electrically erasable programmable read-only memory (EEPROM).

The additive manufacturing machine 1 in addition comprises an aperture 6, here filled with a window, configured to allow access to the ophthalmic lens 10 additively manufactured by this machine 1 on the manufacturing holder 12 of the latter.

The additive manufacturing machine 1 furthermore includes a measuring device (not shown) configured to measure geometric values representative of the average curvature Cm at least at a given point in at least one zone P (FIG. 3) of said ophthalmic lens 10 during its additive manufacture.

This measuring device is provided with a measuring pupil 30 (FIG. 4) having a predetermined diameter. It will be noted that this measuring device may for example function according to a known deflectometry principle.

It will be noted that in order to additively manufacture the ophthalmic lens 10, precise knowledge is needed of certain parameters of additive manufacture, such as the speed of advance of the nozzle or nozzles 13, the energy and energy source implemented, here a source emitting in the ultraviolet for the three-dimensional printing machine but it could be a laser in the case of a stereolithography machine or else a heating energy in the case of tensioned thread deposition also called thermoplastic thread extrusion.

Precise knowledge is also needed of the material or materials used and their state, here in photopolymer liquid form.

It is also necessary to know with precision the simple or complex optical functions prescribed to the ophthalmic lens 10, which optical functions are characterized by geometries defined in a manufacturing file representative of the simple or complex optical properties of the ophthalmic lens 10. According to a variant, it is also necessary to know personalization parameters of the wearer and/or parameters of the geometry of the frame dedicated to receiving the ophthalmic lens 10, in order to adjust the optical function of this ophthalmic lens to its final use conditions.

It will be reminded that the expression "optical function of an ophthalmic lens" is understood to mean the optical response of this lens, i.e. a function defining any modification of the propagation and transmission of an optical beam through the lens in question, whatever the incidence of the entering optical beam and whatever the geometric extent of the entrance diopter illuminated by the incident optical beam.

More precisely, in the ophthalmic field, optical function is defined as the distribution of wearer power and astigmatism characteristics, of prismatic deviations, and of higher-order aberrations associated with the lens for all the directions of the gaze of a wearer of this lens. Of course, this assumes that the geometric position of the lens relative to the eye of the wearer is already known.

It will also be noted that wearer power is a way of calculating and adjusting the power of the ophthalmic lens, which is different from lensmeter power. Calculation of wearer power ensures that the power perceived by the wearer (i.e. the power of the beam of light that enters into the eye), once the lens has been fitted in the frame and is being worn by the wearer, corresponds to the prescribed power. In general, for a progressive eyeglass, at any point on the eyeglass and especially at its far-vision and near-vision reference points, the power measured with a lensmeter is different from the wearer power. However, the wearer power at the optical center of a unifocal lens is generally close to the power observed with a lensmeter positioned at this point.

FIGS. 2 and 3 schematically show the ophthalmic lens 10 during additive manufacturing whereas FIG. 4 shows, also schematically, various manufacturing steps of this lens 10.

The ophthalmic lens 10 has a body provided with a first face 15, called the front face, that here is convex, and a second face 16, called the back face, that here is substantially planar.

It will be noted that the first and second faces 15 and 16 define two diopters that will characterize the optical function of the ophthalmic lens 10.

This second face 16 is planar since it is this face that faces the manufacturing surface on which the ophthalmic lens 10 is additively manufactured.

The ophthalmic lens 10 has a peripheral edge joining the first face 15 to the second face 16.

The ophthalmic lens 10 is here formed by a plurality of predetermined volume elements that are juxtaposed and superposed to form a plurality of superposed layers of a material 12.

This plurality of superposed layers forms the body, together with the first face 15 and the second face 16 of this ophthalmic lens 10.

It will be noted that the superposed layers of the first material 12 here have different lengths so as to form the first and second faces 15 and 16 of this ophthalmic lens 10.

It will be noted that the notion of "layers" is only nominally applicable to certain additive manufacturing technologies, a layer then merely being a set of voxels artificially deposited in a given pass of the nozzles or with a given mask. However, the teaching of the present invention is easily transferred to these technologies.

These layers here each have a substantially constant thickness over their length and they all have substantially the same thickness. It will be noted that certain additive manufacturing technologies may produce layers with thicknesses that vary throughout the layer. However, the teaching of the present invention is easily transferred to these technologies.

It will be noted that this equi-thickness is obtained here by virtue of controlled spraying, by the nozzle or the bank of nozzles 13 of the additive manufacturing machine 1, of a set number of predetermined volume elements in each superposed layer of the material 12.

It will be noted that here the material 12 is an acrylic polymer, and more precisely a photopolymer, for example a photopolymer such as the product marketed by the company OBJET Ltd, under the trademark VeroClear™.

It will be noted that the additive manufacture of the ophthalmic lens 10 may require, in addition to the deposition of the plurality of successive superposed layers, one or more photopolymerization steps. The photopolymerization steps may take place on deposition of each volume element or a blanket photopolymerization may be carried out after one pass of the nozzle and/or the bank of nozzles or after each layer of material has been deposited. Moreover, it will be noted, as will be seen below in more detail, that the ophthalmic lens 10 may not be completely polymerized at the end of the additive manufacturing step of this ophthalmic lens 10.

FIG. 2 shows the ophthalmic lens 10 only partially manufactured, and more particularly, its first face 15 is not completed whereas its second face 16 is completed.

It will be observed that a dotted line is shown in the body of the ophthalmic lens 10, which line defines the shape, in cross section, of the first and second faces 15 and 16 of the ophthalmic lens 10.

This dotted line corresponds to a geometric envelope 18 of the ophthalmic lens 10 to be manufactured, this envelope being referred to as the target geometric envelope (also referenced Ec).

This target geometric envelope 18 is representative of target manufacturing settings of the ophthalmic lens 10.

The curved portion of the dotted line is particularly visible since the latter defines the first face 15 of the ophthalmic lens 10, which first face 15 is here not completed.

This curved portion of the dotted line includes the highest point of the diopter that the first face 15 must define, which point is referenced PHD in FIGS. 2 and 3.

FIG. 3 shows from above a plurality of zones of the ophthalmic lens 10 illustrated in FIG. 2, certain of which are referenced P.

The zones P are representative of zones of the ophthalmic lens 10 the "target" additive manufacture of which has been completed. In other words, the zones P each have a target curvature profile referred to as a completed target curvature profile, whereas the other zones each have a target curvature profile that is what is referred to as an incomplete target curvature profile.

The surface of the ophthalmic lens 10 is thus characterized by zonewise sampling (a sample corresponding to a "completed" or "incomplete" zone).

It will be observed that on the surface of the ophthalmic lens 10 are also shown two concentric circles 20 and 21 centered on the point PHD (here the center of the ophthalmic lens 10).

These two circles 20 and 21 are located between the periphery and the center of the ophthalmic lens 10 and each have a predetermined diameter.

FIG. 4 schematically shows various steps of a process for manufacturing the ophthalmic lens 10, said steps being only partially illustrated.

On the left in FIG. 4 a detail of the ophthalmic lens 10 illustrated in FIG. 2 is shown, which lens is in the process of being additively manufactured using the additive manufacturing machine in FIG. 1, the lens being manufactured to target manufacturing settings (also referred to as the starting settings) that defines the target geometric envelope 18 of the ophthalmic lens 10.

It will be noted that the target geometric envelope 18 of the ophthalmic lens 10 is defined from target geometric characteristics, and characterizes target geometric values representative of target average curvatures at set points on the surface of the ophthalmic lens 10.

It will be seen, on the left in FIG. 4, that there is a geometric difference between the curved portion of the dotted line representing the target geometric envelope 18 and the ophthalmic lens 10 actually additively manufactured, which geometric difference is representative of a manufacturing error.

Specifically, in this detail, five superposed layers of material 12 are partially shown, the first-face-side ends of which may be seen. Between two immediately superposed layers the thickness (or height) of which is predetermined, a step having a length is formed. It may be seen that the two steps closest to the second face 16 extend as far as the curved portion of the dotted line representing the target geometric envelope 18, whereas the top three steps (which are further from the second face and closer the first) are a distance away from this curved portion.

The geometric difference is determined by virtue of measurements carried out in the zones P of the ophthalmic lens 10 and by comparing these measurements with the target characteristics (described in more detail below).

Depending on the geometric difference determined, a modified target geometric envelope 19 (on the right in FIG. 4) of the ophthalmic lens 10 is then defined on the basis of modified target geometric characteristics (described in more detail below) and modified target manufacturing settings are deduced therefrom.

On the right in FIG. 4 a detail of the ophthalmic lens 10 illustrated in FIG. 3 is shown, which lens is again in the process of being additively manufactured using the additive manufacturing machine in FIG. 1, the lens now being manufactured to the modified target manufacturing settings.

In other words, the ophthalmic lens 10 is additively manufactured to corrected manufacturing settings determined from measurements carried out in the zones P, in order to obtain the desired optical function.

It will be observed here that a set number of predetermined volume elements 14 has been added to the three top steps, in accordance with the modified target manufacturing settings, so that each of the steps shown on the right in FIG. 4 extends as far as the curved portion of the dotted line representing the modified target geometric envelope 19.

Implementing these manufacturing steps on the ophthalmic lens 10 during its manufacture in the machine 1 allows the ophthalmic lens 10 having the optical function, which here is complex, that is prescribed thereto to be obtained.

A process for manufacturing this ophthalmic lens 10 will now be described in more detail with reference to FIGS. 5 to 8.

The manufacturing process comprises the step 100 of additively manufacturing the ophthalmic lens 10 with the additive manufacturing machine 1, according to a set target geometry represented by the target geometric envelope 18.

The command/control unit 2 of the additive manufacturing machine 1 is therefore configured to additively manufacture the ophthalmic lens 10 so that it has the determined target geometric characteristics.

The unit 2 is furthermore configured to determine, in the step 200, at least one geometric value representative of the average curvature Cm at at least one given point in an additively manufactured zone P having a completed target curvature profile.

The unit 2 is furthermore configured to compare, in the step 300, the determined geometric value representative of the average curvature Cm to a geometric value representative of the target average curvature Cmc at said given point in said zone P, the latter geometric value being determined from the target geometric envelope of the ophthalmic lens 10, to which envelope the latter is manufactured.

The comparison carried out in step 300 delivers a result representative of a difference Ecdif in average curvature (defining a difference in geometric envelope) between the objective (the target lens) and the actual case (the manufactured lens).

If the result of the comparison is that the difference Ecdif in average curvature is smaller than a first predetermined threshold $S_1$, then the additive manufacture of the ophthalmic lens 10 continues with the target manufacturing settings.

If the result of the comparison is that the difference Ecdif in average curvature is larger than the first predetermined threshold $S_1$, then the unit 2 is configured to determine, in the step 400, the number of predetermined volume elements 14 to be added to the zone P, and whether it is an altitude or curvature addition that is required in this zone P.

In the same step 400, when it is determined that a curvature addition of a set number of predetermined volume elements is what is required, the unit 2 is furthermore configured to determine the modified target geometric envelope 19 of the ophthalmic lens 10 (see below).

The additive manufacturing of the ophthalmic lens 10 therefore continues either with the target manufacturing settings, or with the corrected manufacturing settings, depending on the result of the comparison.

The process steps described above are also implemented in other zones P of the ophthalmic lens 10 and at least in certain already corrected zones P in order to check that the addition made is representative of the determined correction and therefore that the actual geometric envelope of the ophthalmic lens 10 corresponds to the modified target geometric envelope.

It will be noted that during the additive manufacture of the ophthalmic lens 10 or when the latter has been completed, the process optionally comprises a step (not shown) of irradiating the ophthalmic lens 10 obtained. This step completes the polymerization of the ophthalmic lens 10.

The process optionally comprises a step (not shown) of treating the front face and/or back face of the ophthalmic lens 10 thus obtained by additive manufacturing, in order to add thereto one or more predetermined coatings, for example an antifog and/or antireflection coating and/or a tinted coating and/or a photochromic and/or anti-scratch coating, etc.

Figure 6:
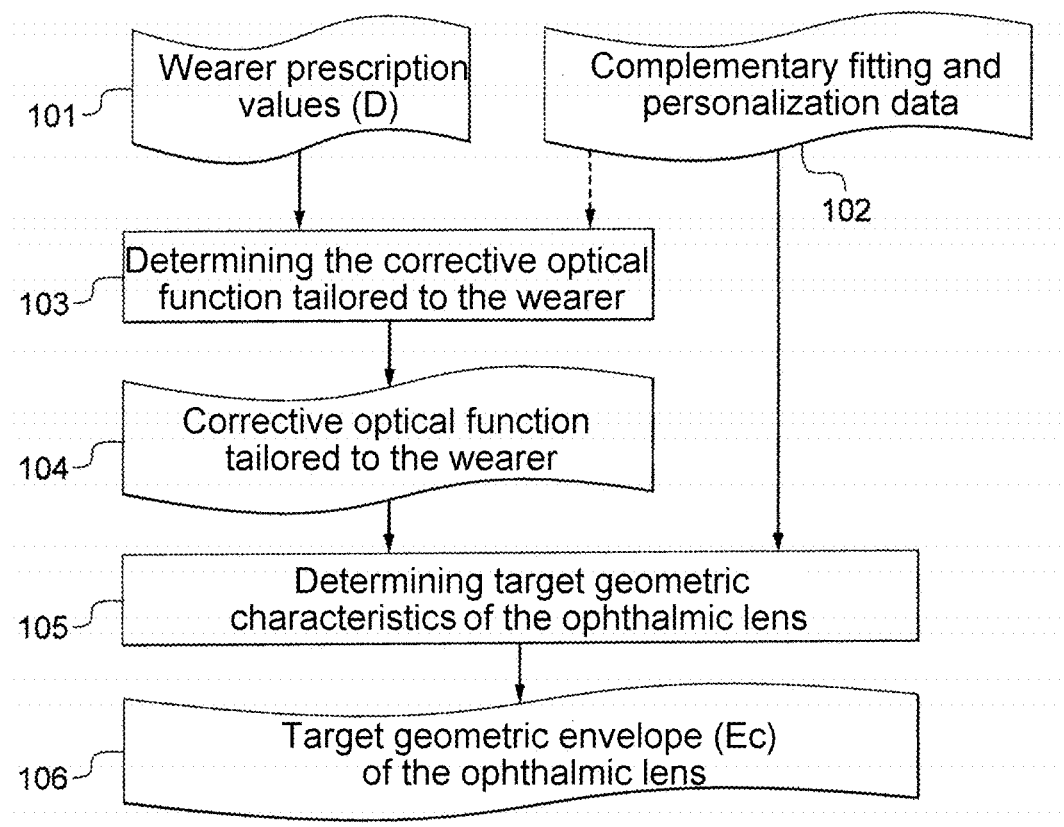
FIGS. 6 to 8 are flowcharts respectively showing in detail certain of the operating steps illustrated in FIG. 5.

FIG. 6 illustrates steps in the manufacturing process and more precisely steps for determining the target geometric envelope of the ophthalmic lens 10 and therefore the target manufacturing settings of the latter.

The unit 2 is configured to receive in step 101 a file containing prescription values of a wearer of the ophthalmic lens 10 to be manufactured.

These prescription values of the wearer are generally expressed in diopters (D).

The unit 2 is furthermore configured to receive, in the step 102, complementary fitting and personalization data relating to the wearer, to a frame intended to receive the ophthalmic lens 10 and to the prescription.

It will be noted that these complementary fitting and personalization data for example correspond to geometric values that especially characterize the frame and the visual behavior of the wearer. It may for example be a question of an eye-lens distance and/or a position of the eye rotation center, and/or of an eye-head coefficient, and/or of a pantoscopic angle and/or of a face-form angle of the frame.

The unit 2 is configured to determine in the step 103 a corrective optical function tailored to the wearer from the wearer prescription values and complementary fitting and personalization data received in the respective steps 101 and 102, and depending on the geometric position of the lens 10 relative to the eye of the wearer.

This corrective optical function tailored to the wearer corresponds to the target optical function of the ophthalmic lens 10 to be manufactured.

It will be noted that the corrective optical function tailored to the wearer may be determined for example using a ray tracing software package, which allows the wearer power and the resulting astigmatism of the lens to be determined for the wear position of the latter. An optimization may be carried out using well-known optical optimization methods.

It will also be noted that the step 102 is optional and therefore that the corrective optical function tailored to the wearer may be determined by the unit 2 in the step 103, only from prescription values received in step 101, and depending on the geometric position of the ophthalmic lens 10 relative to the eye of the wearer.

The unit 2 is configured to generate in the step 104 a file named "optical function" that characterizes the corrective optical function tailored to the wearer, as determined in the step 103.

It will be noted that this "optical function" file is what is called a surface file that for example contains geometric characteristics taking the form of x, y, z, θ coordinates of a finite number of points, or the form of a surface function z=f(x,y) defining each face, these characteristics being associated with a refractive index and with various distances and angles such as those mentioned above.

It will be noted that the corrective optical function tailored to the wearer may, instead of being determined by the unit 2 in the step 103, be received directly by this unit 2 in the form of such a file.

The unit 2 is configured to determine, in the step 105, target geometric characteristics for the ophthalmic lens 10 to be manufactured, from the "optical function" file generated in the step 104 and from complementary fitting and personalization data received in the step 102, and in particular the data related to the frame provided to receive the ophthalmic lens 10.

The unit 2 is configured to generate in the step 106 a file named "target geometry" that characterizes the geometric characteristics of the ophthalmic lens 10 to be manufactured, as determined in the step 105.

It will be noted that this "target geometry" file is also what is called a surface file that for example contains geometric characteristics taking the form of x, y, z, θ coordinates of a finite number of points, or the form of a surface function z=f(x,y) defining each face, these characteristics being associated with a refractive index and with various distances and angles such as those mentioned above. The file "target geometry" is in fact representative both of the optical function and of the geometry to be given to the ophthalmic lens 10.

It will be noted that the unit 2 is furthermore configured to receive (step not shown) a file containing characteristics related to the refractive index of the material 12 used to additively manufacturing the ophthalmic lens 10.

It will also be noted that the unit 2 is configured to determine (step not shown), optionally, a dimensional shrinkage and an index variation of the ophthalmic lens 10. It is here a question of possible subsequent changes, on the one hand, to the refractive index of the material 12 in which the ophthalmic lens 10 is manufactured, and on the other hand, to the geometry (dimensional shrinkage) of the ophthalmic lens 10.

It will be noted that the geometry of the ophthalmic lens 10 is defined so as to directly match the outline of the frame in which the lens 10 is configured to be fitted. As a variant, the outline of the lens 10, as defined in this file, does not correspond to the outline of the frame and an edging operation is required.

The unit 2 is furthermore configured to determine (step not shown) the manufacturing settings of the ophthalmic lens 10, from characteristics contained in the "target geometry" file and optionally characteristics relating to the material used.

The unit 2 is configured to generate (step not shown) the manufacturing file corresponding to the manufacturing settings of the ophthalmic lens 10 on the manufacturing holder 12 of the additive manufacturing machine 1 (in a known coordinate system of this machine).

This "settings" file is similar to the target geometry file of the ophthalmic lens generated in step 106, the difference being that it reflects a transcribed description of the geometry desired for the ophthalmic lens 10 to be manufactured, with, in practice, an arrangement of the predetermined volume elements of the one or more materials including a set angular orientation of the ophthalmic lens 10 on the manufacturing holder 12 for its manufacture, and modifications related to possible dimensional shrinkage and possible variation in the index of the ophthalmic lens 10.

Figure 7:
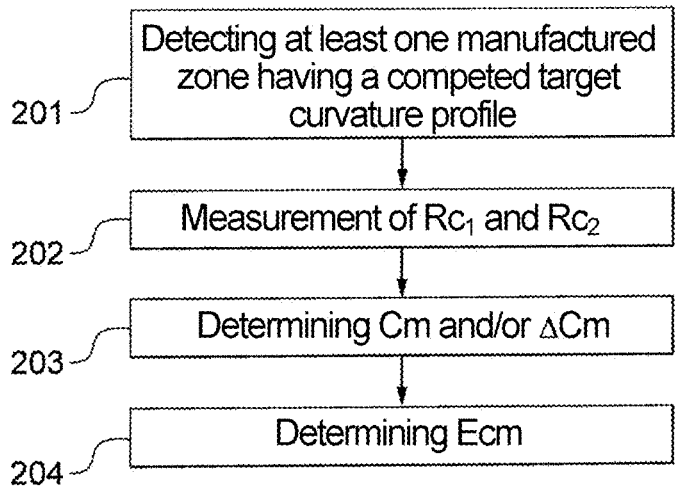

FIG. 7 illustrates other steps of the manufacturing process and more precisely steps for determining the average curvature at a given point in a zone P.

The unit 2 is configured to detect, in the step 201, an additively manufactured zone P having a completed target curvature profile.

The unit 2 is furthermore configured to measure, in the step 202, at least one pair of radii of curvature $Rc_1$, $Rc_2$ associated with one or more given points in the zone P.

This measuring step 202 is carried out using the measuring device provided with a measuring pupil 30 of the additive manufacturing machine 1, for example by deflectometry.

The measuring pupil 30 is for example moved, starting from an edge of the zone P on the edge face of the ophthalmic lens 10, to the point PHD.

As a variant, the measuring pupil 30 may for example be moved starting from the edge of the zone P on the edge face of the ophthalmic lens 10 as far as one of the two circles 20 and 21, or indeed only be moved between the two circles 20 and 21, or even moved from one of the circles 20 and 21 as far as the point PHD.

It will be noted that the zone P has an outline defining a space that, at its narrowest point, is at least as large as the measuring pupil 30.

It will also be noted that the zone P may, as a variant, be representative of a cell (corresponding to a sample) defined on the surface of the ophthalmic lens 10 and having a predetermined diameter that is at least as large as that of the measuring pupil.

The unit 2 is configured to determine, in the step 203, a geometric value for the average curvature Cm at each given point and/or a value representative of the largest difference ΔCm in the average-curvature geometric values in the zone P, from the measured geometric values of the radii of curvature $Rc_1$, $Rc_2$.

The steps 202 and 203 are for example implemented at a plurality of given points in a plurality of zones P.

The unit 2 is furthermore configured to determine, in the step 204, from geometric values of average curvature Cm at the given points in the detected zones and/or values representative of the largest difference ΔCm in average-curvature geometric values in the detected zones P, the actual geometric characteristics of the zones P of the ophthalmic lens 10 being additively manufactured, and therefore the (at least partial) actual geometric envelope of this ophthalmic lens 10.

Figure 8:
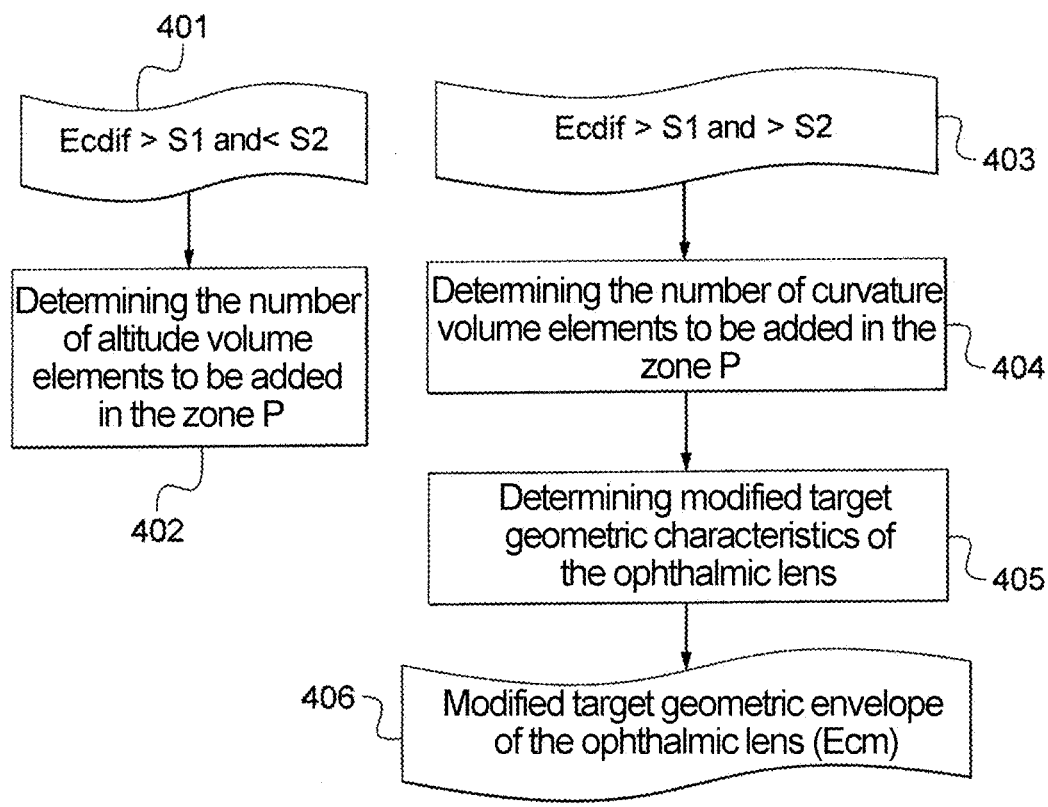

FIG. 8 illustrates other steps of the manufacturing process and more precisely steps for determining the number of predetermined volume elements 14 and, if needs be, for determining the modified target geometric envelope 19 (also referenced Ecm) of the ophthalmic lens 10 being additively manufactured.

The unit 2 is configured to receive a file containing the result of the comparison carried out in step 300 in steps 401 and 403, depending on the result of this comparison.

If the result of the comparison is that the difference Ecdif in average curvature is larger than the first predetermined threshold $S_1$ and lower than a second predetermined threshold $S_2$ (step 401), the unit is furthermore configured to determine, in step 402, the number of predetermined volume elements 14 to be added altitudewise to the zone(s) P of the ophthalmic lens 10 being manufactured.

The thresholds S1 and S2 depend on the zone P in question and on the optical function to be obtained with the ophthalmic lens, computational methods known to the skilled person allowing these thresholds to be added.

For example, the threshold S1 is comprised between 0.06 diopters and 0.12 diopters; and the threshold S2 is higher than 0.1 diopters; it being understood that the threshold S2 is higher than the threshold S1.

The unit 2 is also configured to initiate additively manufactured altitude addition of the set number of predetermined volume elements in the zone(s) P, then to continue the additive manufacturing of the ophthalmic lens 10 with the target manufacturing settings (starting settings).

If the result of the comparison is that the difference Ecdif in average curvature is larger than the first predetermined threshold $S_1$ and also larger than the second predetermined threshold $S_2$ (step 403), the unit is furthermore configured to determine, in step 404, the number of predetermined volume elements 14 to be added curvaturewise to the zone(s) P of the ophthalmic lens 10 being manufactured.

The unit 2 is furthermore configured to determine, in the step 405, modified target geometric characteristics of the ophthalmic lens 10 being manufactured, from the target geometric characteristics, actual geometric characteristics and the number of predetermined volume elements to be added, as determined in steps 105, 202, 203, 204 and 404.

In the same step 405, the modified target geometric envelope of the ophthalmic lens 10 is determined from the modified target geometric characteristics of the ophthalmic lens 10.

It will be noted that the determining step 405 may optionally take into consideration characteristics related to the refractive index of the material 12 used to additively manufacture the ophthalmic lens 10 and possible dimensional shrinkage and variation in the index of the ophthalmic lens 10 (as indicated above with regard to the step of determining the target geometric envelope).

The unit 2 is furthermore configured to generate, in the step 406, a file that characterizes the modified target geometric characteristics, this file being named "modified target geometric envelope".

It will be noted that this "modified target geometric envelope" file is also what is called a surface file that for example contains geometric characteristics taking the form of x, y, z, θ coordinates of a finite number of points, or the form of a finite surface function z=f(x,y) defining each face, these characteristics being associated with a refractive index and with various distances and angles such as those mentioned above. The file "modified target geometric envelope" is in fact representative both of the optical function and of the geometry to be given to the ophthalmic lens 10.

The unit 2 is furthermore configured to determine (step not shown) the corrected manufacturing settings of the ophthalmic lens 10, from characteristics contained in the "modified target geometric envelope" file and optionally characteristics relating to the material used.

The unit 2 is configured to generate (step not shown) the corrected manufacturing file corresponding to the corrected manufacturing settings of the ophthalmic lens 10 on the manufacturing holder 12 of the additive manufacturing machine 1 (in a known coordinate system of this machine).

This "corrected settings" file is similar to the modified target geometry file of the ophthalmic lens generated in step 406, the difference being that it reflects a transcribed description of the geometry desired for the ophthalmic lens 10 to be manufactured, with, in practice, an arrangement of the predetermined volume elements of the one or more materials including a set angular orientation of the ophthalmic lens 10 on the manufacturing holder 12 for its manufacture, and modifications related to possible dimensional shrinkage and possible variation in the index of the ophthalmic lens 10.

The unit 2 is also configured to initiate additively manufactured curvature addition of the set number of predetermined volume elements in the zone(s) P, then to continue the additive manufacturing of the ophthalmic lens 10 with the modified target manufacturing settings (corrected settings).

The command/control unit 2 is therefore configured to run a software package for implementing the various steps described above of the manufacturing process of the ophthalmic lens 10 using the received parameters, in order to produce this ophthalmic lens 10.

In one variant (not illustrated) a client-server communication interface has what is referred to as a provider side and what is referred to as a client side, these two sides communicating over a network, for example the Internet.

The provider side comprises a server connected to a command/control unit of the same type as that in FIG. 1, but this time not integrated into an additive manufacturing machine, this server being configured to communicate with the Internet interface.

The client side is configured to communicate with the Internet interface, and is connected to a command/control unit of the same type as that of the provider side.

Furthermore, the client-side unit is connected to an additive manufacturing machine of the same type as that in FIG. 1 for manufacturing the ophthalmic lens.

The client-side unit is configured to receive the data files corresponding to steps 101 and 102, and the data characterizing the material used.

The client-side unit transmits via the Internet interface and the server these data to the provider-side unit in order to determine the target and modified target manufacturing settings of the ophthalmic lens.

The provider-side unit runs, via its data processing system, the computer program that it contains for implementing the manufacturing process and thus determines, on the one hand, the target manufacturing settings of the ophthalmic lens, and on the other hand, the modified target manufacturing settings for the manufacture of this ophthalmic lens.

The provider-side unit transmits in real time, via the server and the network, a file representative of the target manufacturing settings of the ophthalmic lens, then a file representative of the determined modified target manufacturing settings of the ophthalmic lens, to the client-side command/control unit.

The client-side unit is configured to run a program for implementing the manufacturing process of the ophthalmic lens, using the received parameters, in order to produce the ophthalmic lens.

As variants (not illustrated):
the superposed and juxtaposed plurality of predetermined volume elements forms superposed layers that each have a thickness that is constant or that varies over their length and/or that all do or do not have the same thickness;
the material is for example a transparent material deposited by stereolithography, this material being for example an epoxy polymer marketed by the company 3D SYSTEMS under the trademark Accura® ClearVue;
the material is a photopolymer comprising: one or more families of molecules having one or more acrylic, methacrylic, acrylate or methacrylate functions; a family of molecules having one or more epoxy, thioepoxy or thiolene functions; a family of molecules having one or more vinyl ether, vinyl caprolactam or vinylpyrolidone functions; a family of hyperbranched or hybrid organic/inorganic materials; or a combination of these functions; the mentioned chemical functions possibly being carried by monomers or oligomers, or being materials well known to those skilled in the art in the field of ophthalmic lenses, or a combination of monomers and oligomers;
the material may comprise at least one photoinitiator;
the material may comprise colloids, in particular colloidal particles of smaller size for example than visible wavelengths, such as for example colloidal particles of silicon oxide $SiO_2$ or colloidal particles of zircon oxide $ZrO_2$;
the material may comprise, in at least certain of the predetermined volume elements, a pigment or dye, for example a dye belonging to the azo or rhodamine or cyanine or polymethine or merocyanine or fluorescein or pyrylium or phthalocyanine or perylene or benzanthrone or anthrapyrimidine or anthrapyridone families, or even a metal-complex dye such as a rare-earth cryptate or chelate;
the ophthalmic lens is produced from other materials, such as polycarbonate, polymethyl methacrylate, polyamide or from the following polymers: thiourethane polymers or episulfide polymers; these materials being well known to those skilled in the art in the field of ophthalmic lenses;
the process furthermore comprises one or more other manufacturing steps, for example an edging step and/or a marking step used to form what are usually referred to as temporary markings;
the additive manufacturing holder has a manufacturing surface on which the ophthalmic lens is additively manufactured, which manufacturing surface is at least partially planar and/or at least partially spherical;
the manufacturing process does not comprise an additional thermal irradiation step and/or an additional actinic irradiation step, such as for example at ultraviolet wavelengths of the spectrum, or even no irradiation step;
the manufacturing process comprises a step in which the index variation of the material of the ophthalmic lens is taken into account, taking the form of an iterative optimization loop according to known optimization procedures;
the material of the ophthalmic lens optionally comprises one or more dyes, and/or nanoparticles configured to modify its optical transmission and/or its appearance, and/or nanoparticles or additives configured to modify its mechanical properties;
the additive manufacturing machine is not a three-dimensional printing machine but rather a stereolithography machine (or SLA for stereolithography apparatus) or a thermoplastic filament extrusion machine, also called a tensioned filament deposition machine (or FDM machine, FDM standing for fuse deposition modeling);
the command/control unit comprises a microcontroller instead of a microprocessor;
the client-server communication interface comprises devices configured to transfer the target and modified target manufacturing settings of the ophthalmic lens, these settings being determined by a computer program, which contains instructions configured to implement each of the steps of the manufacturing process described above when this computer program is run in a command/control unit that comprises system elements configured to run said computer program;

the communication interface enables communication via means other than the Internet, for example via an intranet or a secure private network; and/or the communication interface makes it possible to transfer the entire computer program to a remote data processing system so as to implement the manufacturing process in another additive manufacturing machine, and optionally in one or more other processing/treatment machines.

It is recalled more generally that the invention is not limited to the examples described and shown.

The invention claimed is:

1. A process for manufacturing an ophthalmic lens (10) having at least one optical function, which comprises:
    a step (100) of additively manufacturing said ophthalmic lens (10), by depositing a plurality of predetermined volume elements of at least one material having a predetermined refractive index, in accordance with a target geometric envelope (18);
    a step of determining an actual geometric envelope at least once during the implementation of said additive manufacturing step (100); and
    a step of triggering a corrective action if there is in a zone (P) a difference (Ecdif) larger than a predetermined threshold (S1, S2) between said target geometric envelope (18) and said actual geometric envelope, wherein said step of triggering a corrective action includes:
    i) implementing a first corrective action when there is, in said zone (P), between said target geometric envelope (18) and said actual geometric envelope, a difference (Ecdif) larger than a first predetermined threshold (S1) and lower than a second predetermined threshold (S2), and
    ii) implementing a second corrective action different from the first corrective action when there is, in said zone (P), between said target geometric envelope (18) and said actual geometric envelope, a difference (Ecdif) larger than said second predetermined threshold (S2), and
    wherein said first corrective action includes depositing, on said zone (P), at least one additional predetermined volume element (14) without replacing the target geometric envelope (18), this deposition being said to be an altitude addition, whereas the second corrective action includes determining a modified target geometric envelope (19) replacing said target geometric envelope (18).

2. The process as claimed in claim 1, wherein said corrective action includes depositing on said zone (P) at least one additional predetermined volume element (14) and/or determining a modified target geometric envelope (19) replacing said target geometric envelope (18).

3. The process as claimed in claim 1, wherein the second corrective action furthermore includes depositing, on said zone (P), at least one additional predetermined volume element (14), this deposition being said to be a curvature addition.

4. The process as claimed in claim 1, wherein:
    said step of determining an actual geometric envelope includes the step (200) of determining at least one geometric value representative of the average curvature (Cm) in said zone (P); and
    to determine said difference (Ecdif) in said zone (P), said process includes the step (300) of comparing said at least one geometric value representative of the average curvature (Cm) to a geometric value representative of the target average curvature (Cmc) required in said zone (P) and determined from said target geometric envelope (18).

5. The process as claimed in claim 4, wherein said step (200) of determining at least one geometric value representative of the average curvature (Cm) includes the step (202) of measuring at least one pair of radii of curvature ($Rc_1$, $Rc_2$) associated with a given point in said zone (P).

6. The process as claimed in claim 5, wherein said step (200) of determining at least one geometric value representative of the average curvature (Cm) furthermore includes the step (203) of determining the geometric value of the average curvature at said given point in said zone (P) and/or a value representative of the largest difference in average-curvature geometric values in said zone (P), from measured geometric values of said at least one pair of radii of curvature ($Rc_1$, $Rc_2$).

7. The process as claimed in claim 5, wherein said step (200) of determining at least one geometric value representative of the average curvature (Cm) furthermore includes the step (204) of determining actual geometric characteristics of said ophthalmic lens (10), defining said actual geometric envelope, from measured geometric values of said at least one pair of radii of curvature ($Rc_1$, $Rc_2$) and/or from said average-curvature geometric value determined in said zone (P) and/or from said value representative of the largest difference in average-curvature geometric values in said zone (P).

8. The process as claimed in claim 1, wherein said zone (P) has a finalized target curvature profile.

9. An additive manufacturing machine configured to manufacture an ophthalmic lens (10) and comprising a command/control unit (2) provided with system elements (3, 4, 5) configured to run a computer program comprising instructions configured to implement each of the steps of the process as claimed in claim 1.

10. The machine as claimed in claim 9, further comprising a measuring device (30) configured to measure geometric values representative of the average curvature (Cm) at least at a given point in at least one zone (P) of said ophthalmic lens (10).

11. The process as claimed in claim 6, wherein said step (200) of determining at least one geometric value representative of the average curvature (Cm) furthermore includes the step (204) of determining actual geometric characteristics of said ophthalmic lens (10), defining said actual geometric envelope, from measured geometric values of said at least one pair of radii of curvature ($Rc_1$, $Rc_2$) and/or from said average-curvature geometric value determined in said zone (P) and/or from said value representative of the largest difference in average-curvature geometric values in said zone (P).

* * * * *